US008922532B2

(12) United States Patent
Choi et al.

(10) Patent No.: US 8,922,532 B2
(45) Date of Patent: Dec. 30, 2014

(54) DISPLAY APPARATUS HAVING A FRAME RATE CONVERTER TO CONVERT A FRAME RATE OF INPUT IMAGE DATA AND METHOD OF DRIVING DISPLAY PANEL

(75) Inventors: Nam-Gon Choi, Asan-si (KR); Jung-Taek Kim, Daejeon (KR); Kyoung-Won Lee, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 298 days.

(21) Appl. No.: 13/408,788

(22) Filed: Feb. 29, 2012

(65) Prior Publication Data

US 2013/0033464 A1 Feb. 7, 2013

(30) Foreign Application Priority Data

Aug. 2, 2011 (KR) ........................ 10-2011-0076806

(51) Int. Cl.

*G06F 3/038* (2013.01)
*G09G 3/36* (2006.01)
*G09G 5/00* (2006.01)
*G09G 5/39* (2006.01)

(52) U.S. Cl.

CPC .............. *G09G 3/3648* (2013.01); *G09G 5/005* (2013.01); *G09G 5/39* (2013.01); *G09G 2320/0261* (2013.01); *G09G 2320/0276* (2013.01); *G09G 2340/02* (2013.01); *G09G 2340/0435* (2013.01); *G09G 2340/16* (2013.01); *G09G 2350/00* (2013.01); *G09G 2360/18* (2013.01)

USPC .............................. 345/204; 345/89; 345/690

(58) Field of Classification Search

CPC .................................................... G09G 3/3648
USPC ........................................... 345/204, 690, 89
See application file for complete search history.

(56) References Cited

U.S. PATENT DOCUMENTS

| | | | | |
|---|---|---|---|---|
| 2010/0053429 A1* | 3/2010 | Miyazaki et al. | ............. | 348/513 |
| 2010/0123698 A1* | 5/2010 | Park et al. | ...................... | 345/208 |
| 2010/0265272 A1* | 10/2010 | Bae et al. | ...................... | 345/690 |
| 2012/0044216 A1* | 2/2012 | Furihata et al. | ............... | 345/204 |
| 2012/0162290 A1* | 6/2012 | Shiomi | ......................... | 345/690 |

FOREIGN PATENT DOCUMENTS

| | | | |
|---|---|---|---|
| JP | 2002-108599 | | 4/2002 |
| JP | 2005-099841 | | 4/2005 |
| JP | 3718832 | | 9/2005 |
| JP | 2010-061105 | | 3/2010 |
| WO | WO 2011/027593 | * | 3/2011 |

* cited by examiner

*Primary Examiner* — Long D Pham

(74) *Attorney, Agent, or Firm* — H.C. Park & Associates, PLC

(57) ABSTRACT

A method of driving a display panel including converting a frame rate of input image data to generate first image data, writing the first image data to a memory, outputting a flag signal to a timing controller, reading the first image data from the memory according to the flag signal, compensating the first image data to generate second image data, and converting the second image data into an analog data voltage and outputting the data voltage to the display panel.

16 Claims, 6 Drawing Sheets

DISPLAY APPARATUS HAVING A FRAME RATE CONVERTER TO CONVERT A FRAME RATE OF INPUT IMAGE DATA AND METHOD OF DRIVING DISPLAY PANEL

CROSS-REFERENCE TO RELATED APPLICATION

This application claims priority from and the benefit of Korean Patent Application No. 2011-76806, filed on Aug. 2, 2011, which is hereby incorporated by reference for all purposes as if fully set forth.

BACKGROUND OF THE INVENTION

1. Field

Exemplary embodiments of the present invention relate to a method of driving a display panel and a display apparatus for performing the method. More particularly, exemplary embodiments of the present invention relate to a method of driving a display panel for improving a display quality and a display apparatus for performing the method.

2. Discussion of the Background

A display apparatus includes a display panel and a panel driver driving the display panel. The display panel includes a plurality of gate lines, a plurality of data lines and a plurality of pixels connected to the gate lines and the data lines.

Generally, the panel driver includes a frame rate converter, a timing controller, a memory, a gate driver and a data driver. The timing controller includes a video interface to receive image data from the frame rate converter and a memory interface to communicate with the memory.

The timing controller includes both the video interface and the memory interface, and the timing controller includes many signal wirings so that a manufacturing cost of the display apparatus increases.

In addition, due to a complex structure for data transmission of the panel driver, a transmission speed decreases so that a display quality of the display panel for a three-dimensional image display, a high speed image display and a high resolution image display deteriorates.

The above information disclosed in the Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a method of driving a display panel simplifying a structure for data transmission of a panel driver to decrease a manufacturing cost of a display apparatus and to improve a display quality of the display panel.

Exemplary embodiments of the present invention also provide a display apparatus for performing the method of driving the display panel.

An exemplary embodiment of the present invention discloses a method of driving a display panel, the method including converting a frame rate of input image data to generate first image data, writing the first image data to a memory, outputting a flag signal to a timing controller, reading the first image data from the memory according to the flag signal, compensating the first image data to generate second image data, and converting the second image data into an analog data voltage and outputting the data voltage to the display panel.

An exemplary embodiment of the present invention also discloses a display apparatus including a display panel, a frame rate converter, a timing controller and a data driver. The display panel displays an image. The frame rate converter converts a frame rate of input image data using a first memory to generate first image data. The frame rate converter writes the first image data to a second memory. The frame rate converter generates a flag signal. The timing controller selectively reads the first image data from the second memory according to the flag signal. The timing controller compensates the first image data to generate second image data. The data driver converts the second image data into an analog data voltage. The data driver outputs the data voltage to the display panel.

An exemplary embodiment of the present invention also discloses a display apparatus including a display panel, a frame rate converter, a timing controller and a data driver. The display panel displays an image. The frame rate converter converts a frame rate of input image data using a memory to generate first image data. The frame rate converter writes the first image data to the memory. The frame rate converter generates a flag signal. The timing controller selectively reads the first image data from the memory according to the flag signal. The timing controller compensates the first image data to generate second image data. The data driver converts the second image data into an analog data voltage. The data driver outputs the data voltage to the display panel.

It is to be understood that both the foregoing general description and the following detailed description are exemplary and explanatory and are intended to provide further explanation of the invention as claimed.

BRIEF DESCRIPTION OF THE ILLUSTRATED EMBODIMENTS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
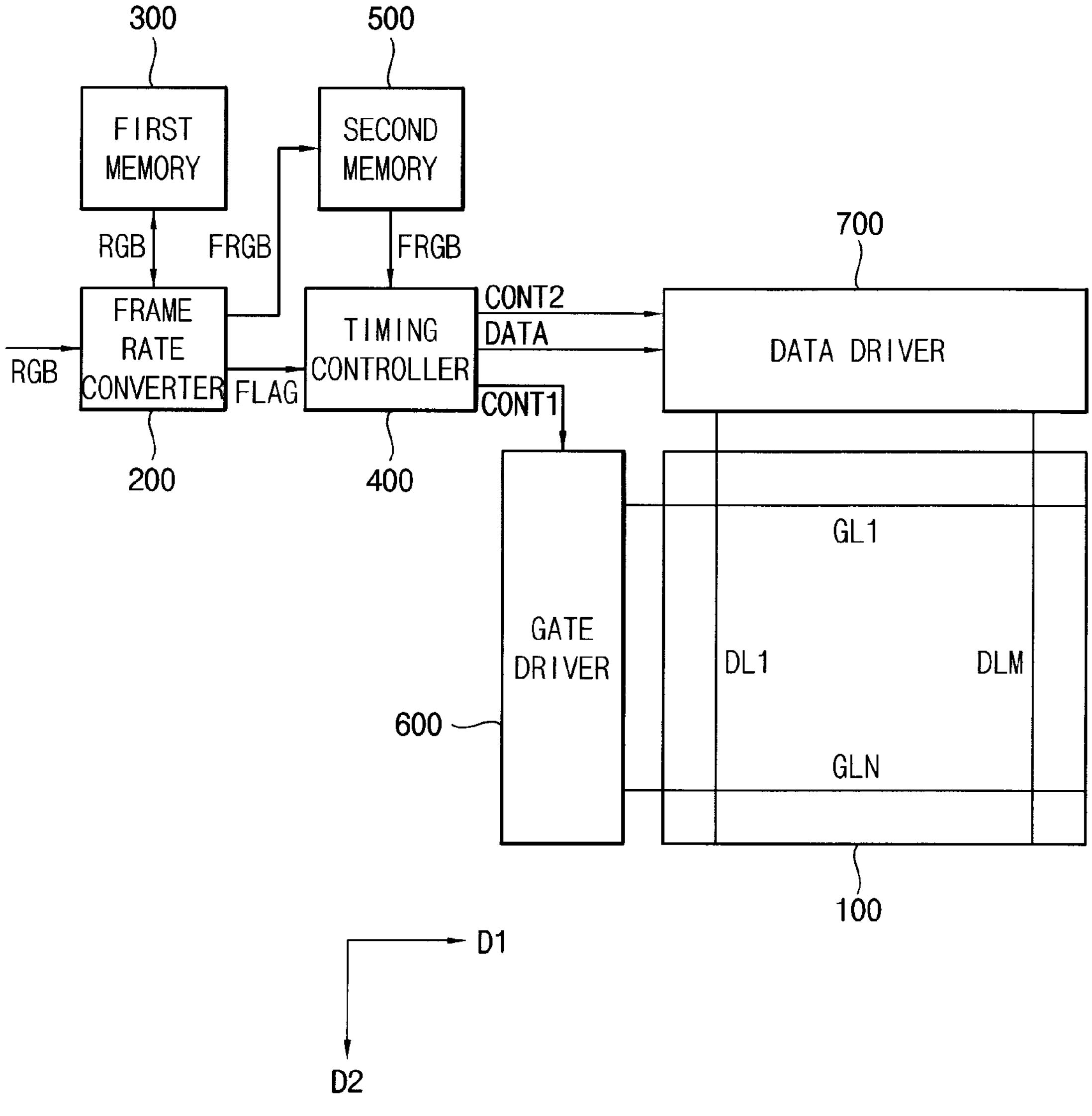
FIG. 1 is a block diagram illustrating a display apparatus according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the present invention will be described in further detail with reference to the accompanying drawings.

FIG. 1 is a block diagram illustrating a display apparatus according to a first exemplary embodiment of the present invention.

Referring to FIG. 1, the display apparatus includes a display panel 100 and a panel driver driving the display panel 100.

The panel driver includes a frame rate converter 200, a first memory 300, a timing controller 400, a second memory 500, a gate driver 600 and a data driver 700.

The display panel 100 includes a plurality of gate lines GL1 to GLN, a plurality of data lines DL1 to DLM, and a plurality of pixels connected to the gate lines GL1 to GLN and the data lines DL1 to DLM.

The gate lines GL1 to GLN extend in a first direction D1, and the data lines DL1 to DLM extend in a second direction D2 crossing the first direction D1.

Each pixel includes a switching element (not shown), a liquid crystal capacitor (not shown) and a storage capacitor (not shown). The liquid crystal capacitor and the storage capacitor are electrically connected to the switching element. The pixels are arranged in a matrix form.

The frame rate converter 200 receives input image data RGB and an input control signal from an external apparatus (not shown). The input image data RGB may include red image data, green image data and blue image data. The input control signal may include a master clock signal, a data enable signal, a vertical synchronizing signal and a horizontal synchronizing signal.

The frame rate converter 200 converts a frame rate of the input image data RGB using the first memory 300 to generate first image data FRGB. The frame rate converter 200 writes the first image data FRGB having the converted frame rate to the second memory 500.

The frame rate converter 200 generates a flag signal FLAG. The frame rate converter 200 outputs the flag signal FLAG to the timing controller 400.

A structure and an operation of the frame rate converter 200 are explained referring to FIGS. 2 and 3 in detail below.

The timing controller 400 receives the input control signal from the frame rate converter 200. Alternatively, the timing controller 400 receives the input control signal from an external apparatus.

The timing controller 400 generates a first control signal CONT1 for controlling a driving timing of the gate driver 600 and a second control signal CONT2 for controlling a driving timing of the data driver 700 based on the input control signal. The timing controller 400 outputs the first control signal CONT1 to the gate driver 600. The timing controller 400 outputs the second control signal CONT2 to the data driver 700.

The first control signal CONT1 includes a vertical start signal and a gate clock signal. The second control signal CONT2 includes a horizontal start signal and a load signal. The second control signal CONT2 may further include a polarity inverting signal.

The timing controller 400 receives the flag signal FLAG from the frame rate converter 200. The timing controller 400 selectively reads the first image data FRGB from the second memory 500 according to the flag signal FLAG.

The timing controller 400 compensates the first image data FRGB to generate second image data DATA. The timing controller 400 outputs the second image data DATA to the data driver 700.

A structure and an operation of the timing controller 400 are explained referring to FIGS. 4 and 5 in detail below.

The gate driver 600 receives the first control signal CONT1 from the timing controller 400. The gate driver 600 generates gate signals for driving the gate lines GL1 to GLN in response to the first control signal CONT1. The gate driver 600 sequentially outputs the gate signals to the gate lines GL1 to GLN.

The gate driver 600 may be disposed, e.g., directly mounted, on the display panel 100, or be connected to the display panel 100 in a tape carrier package ("TCP") type. Alternatively, the gate driver 600 may be integrated on the display panel 100.

The data driver 700 receives the second control signal CONT2 and the second image data DATA from the timing controller 400. The data driver 700 receives a gamma reference voltage from a gamma voltage generator (not shown). The gamma voltage generator may be disposed in the timing controller 400 or in the data driver 700.

The data driver 700 converts the second image data DATA into analog data voltages using the gamma reference voltage in response to the second control signal CONT2. The data driver 700 sequentially outputs the data voltages to the data lines DL1 to DLM.

The data driver 700 may be disposed, e.g., directly mounted, on the display panel 100, or be connected to the display panel 100 in a TCP type. Alternatively, the data driver 700 may be integrally formed on the display panel 100.

Figure 2:
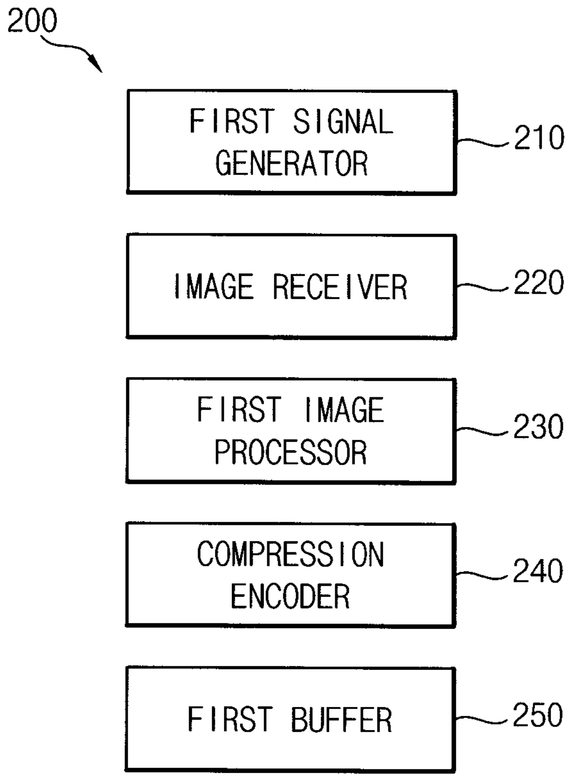
FIG. 2 is a block diagram illustrating a frame rate converter of FIG. 1.

FIG. 2 is a block diagram illustrating the frame rate converter 200 of FIG. 1. FIG. 3 is a block diagram illustrating a first image processor 230 of FIG. 2.

Figure 3:
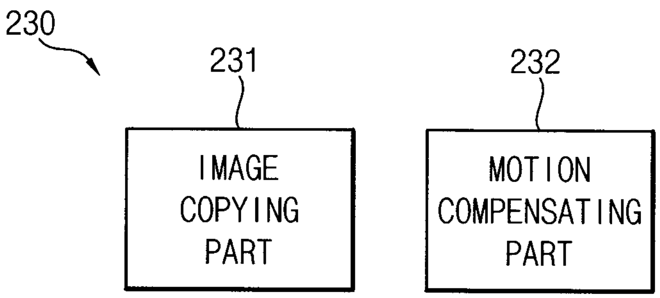
FIG. 3 is a block diagram illustrating a first image processor of FIG. 2.

Referring to FIGS. 1 to 3, the frame rate converter 200 includes a first signal generator 210, an image receiver 220, the first image processor 230, a compression encoder 240 and a first buffer 250.

The first signal generator 210 generates a first memory control signal, a second memory control signal and the flag signal FLAG.

The first memory control signal controls an operation of the first memory 300. The first signal generator 210 outputs the first memory control signal to the first memory 300.

The second memory control signal controls an operation of the second memory 500. The first signal generator 210 outputs the second memory control signal to the second memory 500.

The flag signal FLAG controls an operation of the timing controller 400. The first signal generator 210 outputs the flag signal FLAG to the timing controller 400. For example, the flag signal FLAG may include a read signal and a write signal. For example, the flag signal FLAG may include a previous frame data read signal, a present frame data write signal, and a present frame data read signal.

The flag signal FLAG may have a differential mode. A signal in a differential mode is defined by a difference between a first reference voltage and a second reference voltage. When a noise is generated at a wiring transmitting the flag signal FLAG, both the first reference voltage and the second reference voltage may be influenced by the noise so that the difference between the first reference voltage and the second reference voltage may be maintained. Thus, the flag signal FLAG may maintain a uniform value regardless of the noise. Alternatively, the flag signal FLAG may have a transistor to transistor logic ("TTL") mode.

The image receiver 220 receives the input image data RGB. The image receiver 220 includes a video interface. The image receiver 220 may receive the input image data RGB from a television set board. The image receiver 220 may transmit the input image data RGB to the first image processor 230. The image receiver 220 may transmit the input image data RGB to the first buffer 250.

The first image processor 230 converts a first frame rate of the input image data RGB into a second frame rate to generate the first image data FRGB having the second frame rate. The first image processor 230 may convert the first frame rate into the second frame rate, which is a multiple of the first frame rate. For example, the first frame rate may be about 60 Hz. For example, first image processor 230 may convert the first frame rate of about 60 Hz into the second frame rate of about 120 Hz. For example, first image processor 230 may convert the first frame rate of about 60 Hz into the second frame rate of about 240 Hz.

The first image processor 230 includes an image copying part 231 and a motion compensating part 232. The image copying part 231 may read the first input image data RGB of the first frame rate stored in the first memory 300 in the second frame rate. Thus, the first image processor 230 may generate the first image data FRGB of the second frame rate including the copied image data.

The motion compensating part 232 may compensate the copied image data by comparing the input image data of the present frame to the input image data of the previous frame. Thus, the motion compensating part 232 may generate the motion compensated first image data FRGB. The motion compensating part 232 may be selectively operated according to the input image data RGB or a set-up of a user.

The compression encoder 240 receives the first image data FRGB from the first image processor 230. The compression encoder 240 compresses the first image data FRGB to decrease a size of the first image data FRGB. The compression encoder 240 outputs the compressed first image data FRGB to the first buffer 250. For example, the compression encoder 240 may compress the first image data FRGB to ⅓ of an original size of the first image data FRGB.

The compression encoder 240 may be omitted according to the input image data RGB. For example, the compression encoder 240 may be omitted when the input image data RGB represents a three-dimensional ("3D") image.

The first buffer 250 is an input-output buffer. The first buffer 250 receives the input image data RGB from the image receiver 220. The first buffer 250 writes the input image data RGB to the first memory 300. The first buffer 250 reads the input image data RGB from the first memory 300.

The first buffer 250 receives the first image data FRGB from the compression encoder 240. When the compression encoder is omitted, the first buffer 250 receives the first image data FRGB from the first image processor 230. The first buffer 250 writes the first image data FRGB to the second memory 500.

The first buffer 250 includes a pad part including an input part and an output part. The pad part may permit bidirectional communication. The pad part may further include a variable resistor connected to the input part and the output part in parallel. A resistance of the variable resistor may be adjusted to compensate for a noise of the input image data RGB and a noise of the first image data FRGB. The compensating method using the variable resistor, as explained above, is called "On Die Termination."

The first memory 300 receives the input image data RGB from the frame rate converter 200 and stores the input image data RGB according to the first memory control signal. The first memory 300 outputs the input image data RGB to the frame rate converter 200 according to the first memory control signal.

The first memory 300 includes a pad part including an input part and an output part. The pad part of the first memory 300 may permit bidirectional communication. The pad part of the first memory 300 may further include a variable resistor connected to the input part and the output part in parallel.

Figure 4:
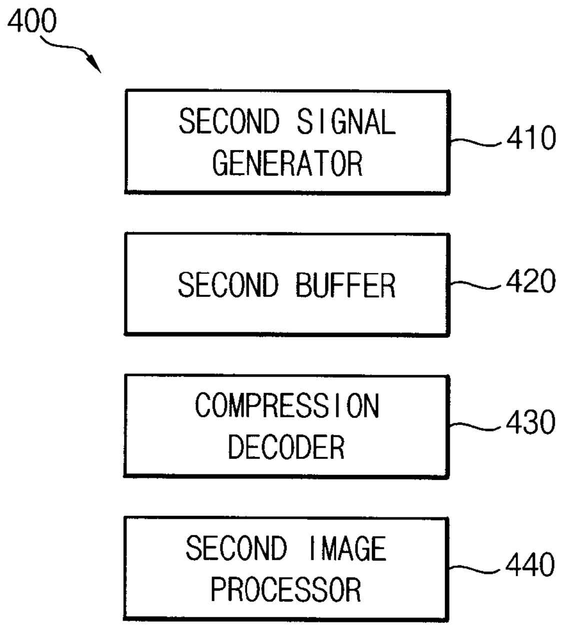
FIG. 4 is a block diagram illustrating a timing controller of FIG. 1.

FIG. 4 is a block diagram illustrating the timing controller 400 of FIG. 1. FIG. 5 is a block diagram illustrating a second image processor 440 of FIG. 4.

Figure 5:
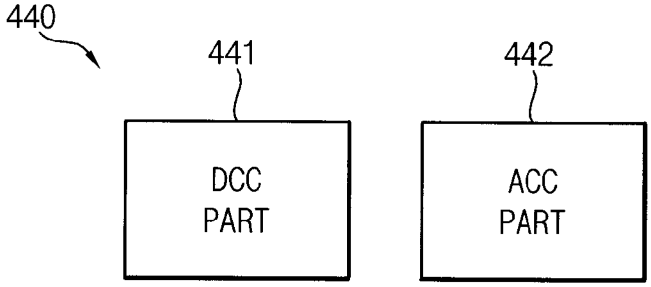
FIG. 5 is a block diagram illustrating a second image processor of FIG. 4.

Referring to FIGS. 1, 4 and 5, the timing controller 400 includes a second signal generator 410, a second buffer 420, a compression decoder 430 and the second image processor 440.

The second signal generator 410 generates the first control signal CONT1 and the second control signal CONT2 based on the input control signal. The second signal generator 410 outputs the first control signal CONT1 to the gate driver 600. The second signal generator 410 outputs the second control signal CONT2 to the data driver 700.

The second buffer 420 is an input-output buffer. The second buffer 420 reads the first image data FRGB from the second memory 500. The second buffer 420 may selectively read the first image data FRGB from the second memory 500 according to the flag signal FLAG.

The second buffer 420 outputs the first image data FRGB to the compression decoder 430. When the compression encoder 240 is omitted, the compression decoder 430 is omitted. When the compression decoder 430 is omitted, the second buffer 420 outputs the first image data FRGB to the second image processor 440.

The second buffer 420 includes a pad part including an input part and an output part. The pad part of the second buffer 420 may permit bidirectional communication. The pad part of the second buffer 420 may further include a variable resistor connected to the input part and the output part in parallel.

The compression decoder 430 receives the first image data FRGB from the second buffer 420. The compression decoder 430 decompresses the compressed first image data FRGB. The compression decoder 430 outputs the decompressed first image data FRGB to the second image processor 440.

The second image processor 440 compensates the first image data FRGB to generate the second image data DATA. The second image processor 440 may compensate the first image data FRGB according to the flag signal FLAG.

The second image processor 440 may include a dynamic capacitance compensation ("DCC") part 441 and an adaptive color correction ("ACC") part 442.

The DCC part 441 provides dynamic capacitance compensation which compensates a grayscale data of the present frame data using the previous frame data and the present frame data.

When the flag signal FLAG is the read signal, the second buffer 420 reads the previous frame data of the first image data FRGB from the second memory 500. When the flag signal FLAG is the write signal, the frame rate converter 200 writes the present frame data of the first image data FRGB to the second memory 500. When the flag signal FLAG is the read signal, the second buffer 420 reads the present frame data of the first image data FRGB from the second memory 500. The DCC part 441 may compensate the present frame data of the first image data FRGB using the previous frame data of the first image data FRGB and the present frame data first image data FRGB, which are stored in the second buffer 420.

The ACC part 442 provides adaptive color correction to the first image data FRGB. The ACC part 442 compensates the first image data FRGB using a gamma curve.

Positions of the DCC part 411 and the ACC part 442 may be switched with each other. Orders of the DCC operation and ACC operation may be switched with each other.

The second memory 500 receives the first image data FRGB from the frame rate converter 200 and stores the first image data FRGB according to the second memory control signal. The second memory 500 outputs the first image data FRGB to the timing controller 400 according to the second memory control signal.

The second memory 500 includes a pad part including an input part and an output part. The pad part of the second memory 500 may permit bidirectional communication. The pad part of the second memory 500 may further include a variable resistor connected to the input part and the output part in parallel.

Referring again to FIG. 1, the frame rate converter 200 may write the input image data RGB to the first memory 300 through a first wiring. The frame rate converter 200 may read the input image data RGB from the first memory 300 through the first wiring. The frame rate converter 200 may write the first image data FRGB to the second memory 500 through a second wiring. The timing controller 400 may read the first image data FRGB from the second memory 500 through a third wiring.

According to the present exemplary embodiment, the frame rate converter 200 directly transmits the first image data FRGB to the second memory 500 without passing through the timing controller 400 so that an image receiver may be omitted in the timing controller 400. Thus, a manufacturing cost of the display apparatus may be decreased.

In addition, a transmission speed between the frame rate converter 200 and the second memory 500 is greater than a transmission speed between the frame rate converter 200 and the timing controller 400 so that the amount of signal wiring may be decreased. Thus, a manufacturing cost of the display apparatus may be decreased.

In addition, a transmission speed between the frame rate converter 200 and the second memory 500 is greater than a transmission speed between the frame rate converter 200 and the timing controller 400 so that a 3D image display, a high speed image display and a high resolution image display may be efficiently processed. Thus, a display quality of the display panel may be improved.

In addition, a transmission speed between the frame rate converter 200 and the second memory 500 is greater than a transmission speed between the frame rate converter 200 and the timing controller 400 so that the compression encoder 240 and the compression decoder 430 may be omitted. Thus, a distortion of an image due to the compression may be prevented so that a display quality of the display panel may be improved.

Figure 6:
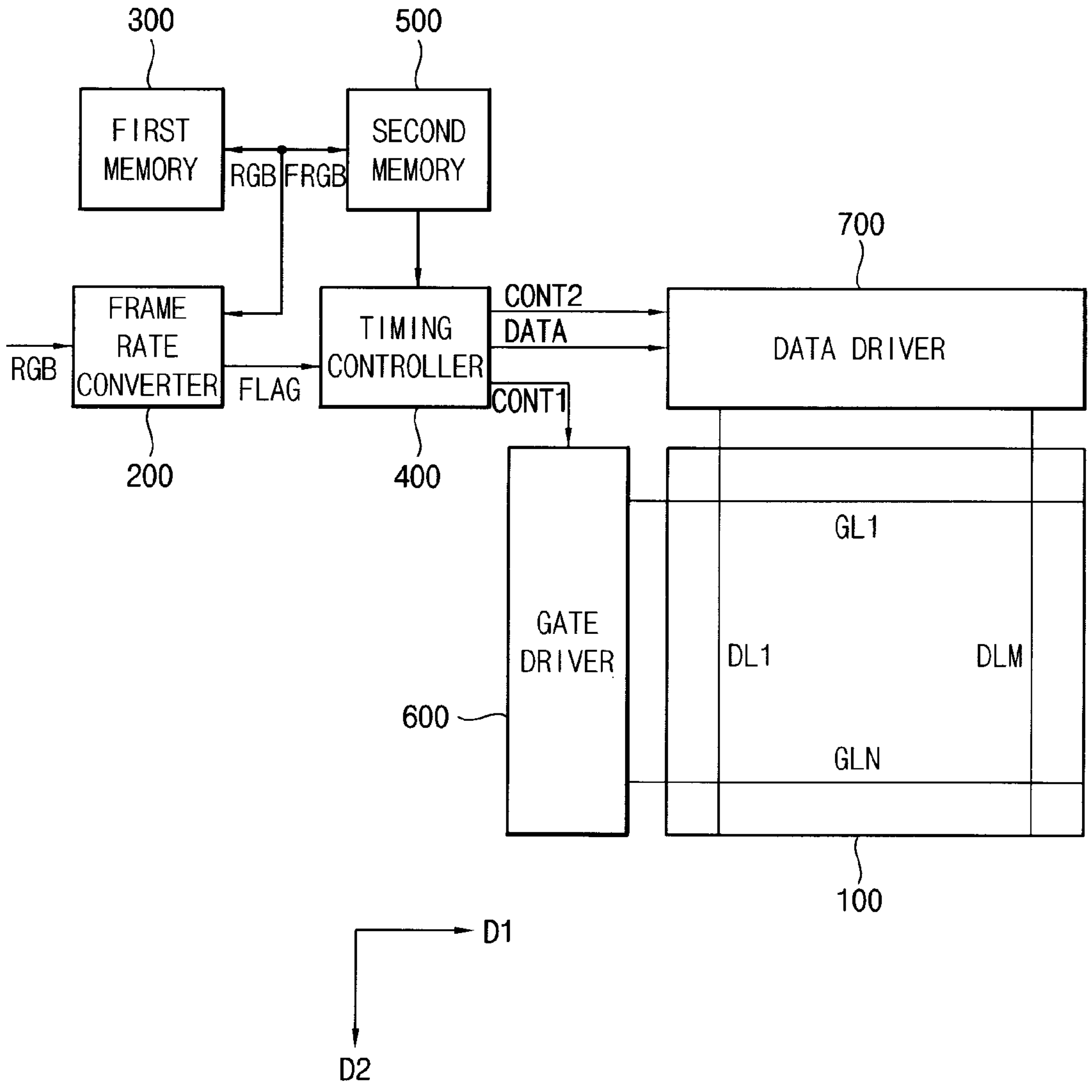
FIG. 6 is a block diagram illustrating a display apparatus according to a second exemplary embodiment of the present invention.

FIG. 6 is a block diagram illustrating a display apparatus according to a second exemplary embodiment of the present invention.

A display apparatus according to the second exemplary embodiment is substantially the same as the display apparatus of the first exemplary embodiment explained referring to FIGS. 1 to 5 except for a wiring structure connecting the frame rate converter 200, the first memory 300 and the second memory 500. Thus, the same reference numerals will be used to refer to the same or like parts as those described in the previous exemplary embodiment of FIGS. 1 to 5 and any repetitive explanation concerning the above elements will be omitted.

Referring to FIG. 6, the display apparatus includes a display panel 100 and a panel driver driving the display panel 100.

The panel driver includes a frame rate converter 200, a first memory 300, a timing controller 400, a second memory 500, a gate driver 600 and a data driver 700.

The frame rate converter 200, the first memory 300 and the second memory 500 are connected with one another through a first wiring having three terminals. A first terminal of the first wiring is connected to the frame rate converter 200. A second terminal of the first wiring is connected to the first memory 300. A third terminal of the first wiring is connected to the second memory 500. The frame rate converter 200 may write the input image data RGB to the first memory 300 through the first wiring. The frame rate converter 200 may read the input image data RGB from the first memory 300 through the first wiring. The frame rate converter 200 may write the first image data FRGB to the second memory 500 through the first wiring. The timing controller 400 may read the first image data FRGB from the second memory 500 through a second wiring.

According to the second exemplary embodiment, the frame rate converter 200, the first memory 300 and the second memory 500 are connected with one another through the first wiring having the three terminals so that a structure for data transmitting of the display apparatus may be more simplified, as compared to the display apparatus of the previous exemplary embodiment, as shown in FIGS. 1 to 5. Thus, a manufacturing cost of the display apparatus may be decreased, and a display quality of the display panel 100 may be improved.

Figure 7:
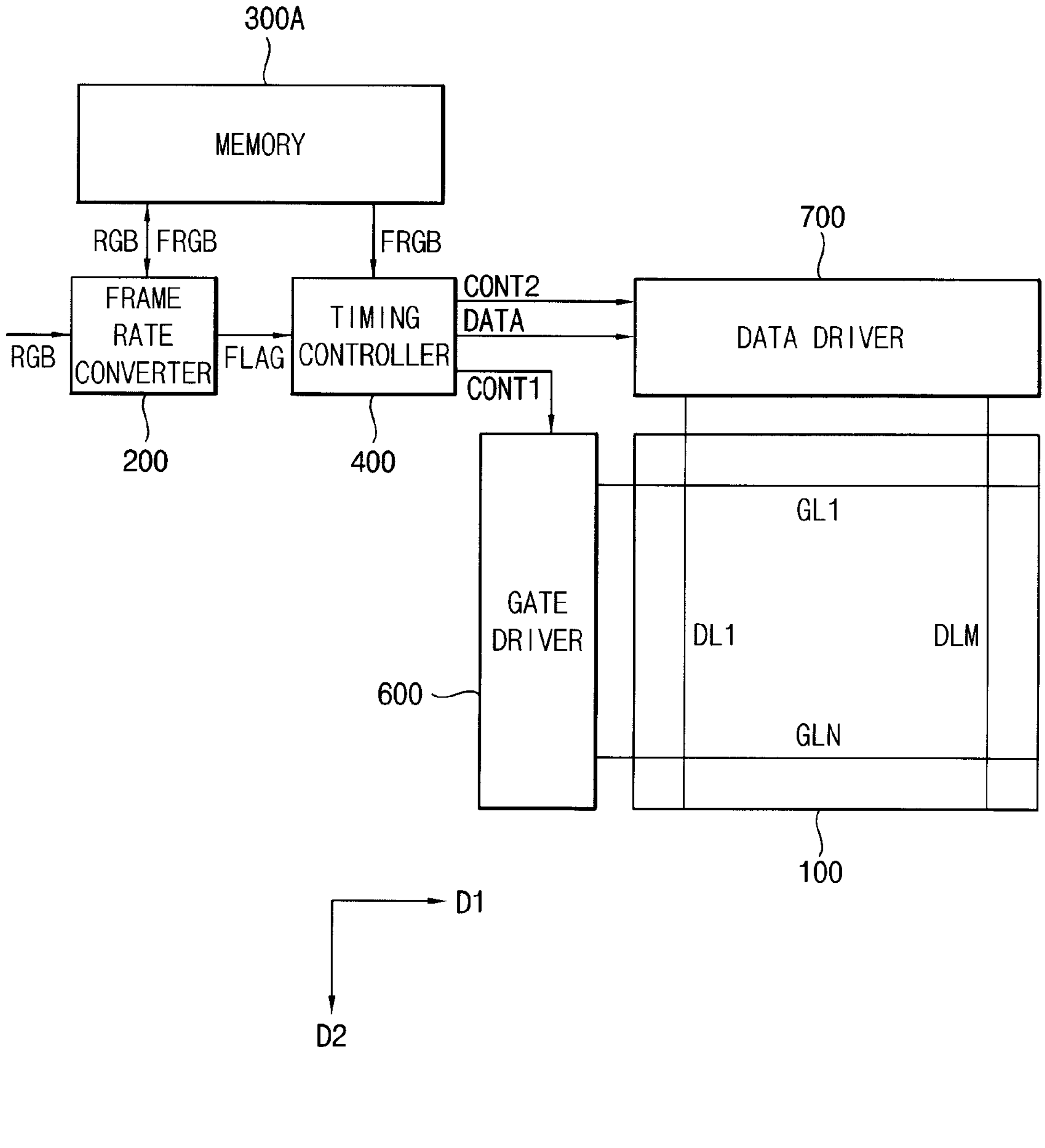
FIG. 7 is a block diagram illustrating a display apparatus according to a third exemplary embodiment of the present invention.

FIG. 7 is a block diagram illustrating a display apparatus according to a third exemplary embodiment of the present invention.

A display apparatus according to the third exemplary embodiment is substantially the same as the display apparatus of the first exemplary embodiment explained referring to FIGS. 1 to 5 except that the frame rate converter 200 and the timing controller 400 use a single memory 300A. Thus, the same reference numerals will be used to refer to the same or like parts as those described in the first exemplary embodiment of FIGS. 1 to 5 and any repetitive explanation concerning the above elements will be omitted.

Referring to FIG. 7, the display apparatus includes a display panel 100 and a panel driver driving the display panel 100.

The panel driver includes a frame rate converter 200, a memory 300A, a timing controller 400, a gate driver 600 and a data driver 700.

The frame rate converter 200 converts a frame rate of the input image data RGB using the memory 300A to generate first image data FRGB. The frame rate converter 200 writes the first image data FRGB having the converted frame rate to the memory 300A.

The memory 300A receives the input image data RGB from the frame rate converter 200 and stores the input image data RGB. The memory 300A outputs the input image data RGB to the frame rate converter 200.

In addition, the memory 300A receives the first image data FRGB from the frame rate converter 200 and stores the first image data FRGB. The memory 300A outputs the first image data FRGB to the timing controller 400.

The memory 300A includes a pad part including an input part and an output part. The pad part of the memory 300A may permit bidirectional communication. The pad part of the memory 300A may further include a variable resistor connected to the input part and the output part in parallel.

The timing controller 400 selectively reads the first image data FRGB from the memory 300A according to the flag signal FLAG.

The frame rate converter 200 may write the input image data RGB to the memory 300A through a first wiring. The frame rate converter 200 may read the input image data RGB from the memory 300A through the first wiring. The frame rate converter 200 may write the first image data FRGB to the memory 300A through the first wiring. The timing controller 400 may read the first image data FRGB from the memory 300A through a second wiring.

According to the third exemplary embodiment, the frame rate converter 200 and the timing controller 400 use a single memory 300A so that a structure for transmitting data of the display apparatus may be more simplified as compared to the display apparatus of the first exemplary embodiment, as shown in FIGS. 1 to 5. Thus, a manufacturing cost of the display apparatus may be decreased, and a display quality of the display panel 100 may be improved.

Figure 8:
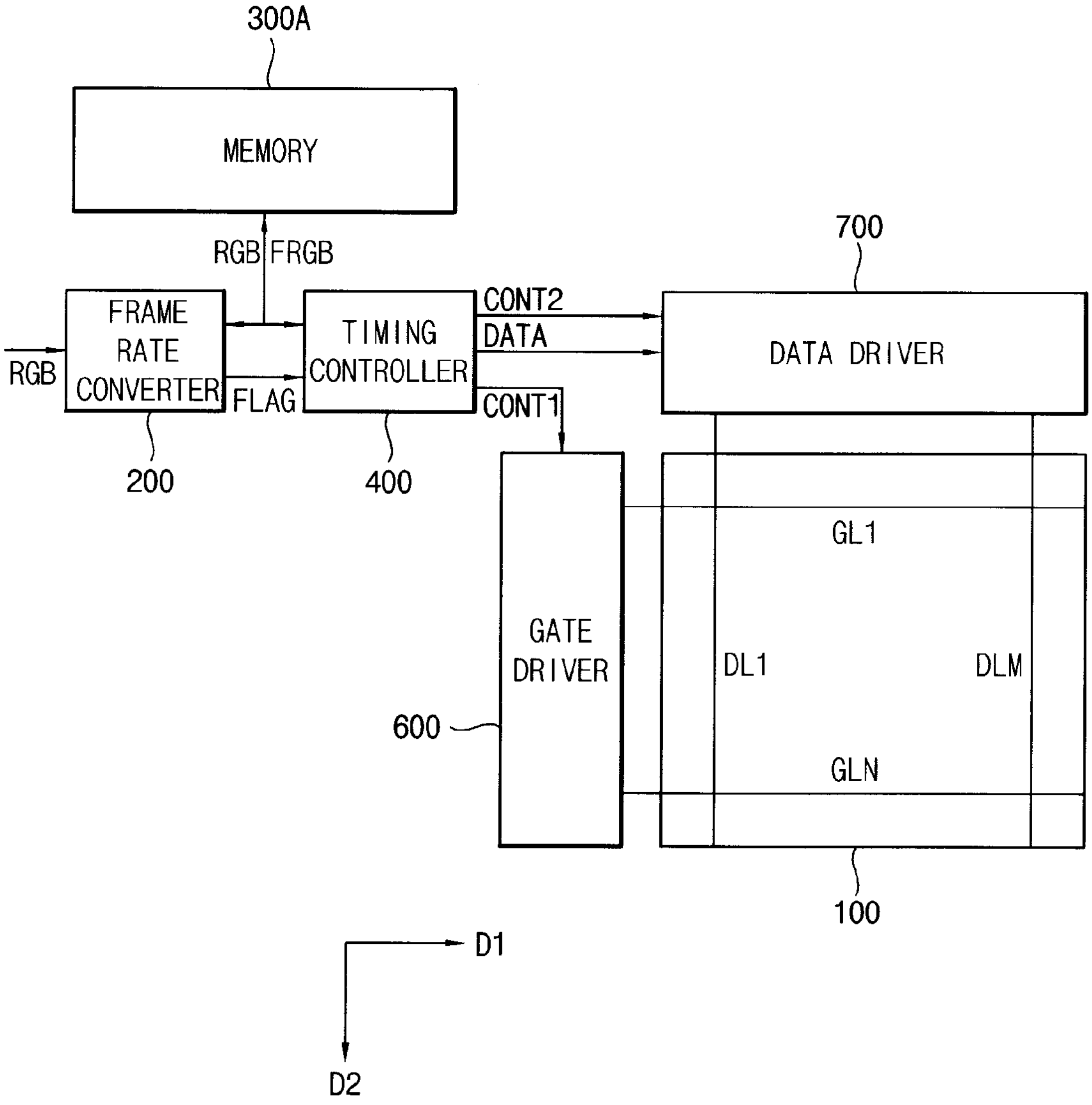
FIG. 8 is a block diagram illustrating a display apparatus according to a fourth exemplary embodiment of the present invention.

FIG. 8 is a block diagram illustrating a display apparatus according to a fourth exemplary embodiment of the present invention.

A display apparatus according to the fourth exemplary embodiment is substantially the same as the display apparatus of the third exemplary embodiment explained referring to FIG. 7 except for a wiring structure connecting the frame rate converter 200, the memory 300A and the timing controller 400. Thus, the same reference numerals will be used to refer to the same or like parts as those described in the third exemplary embodiment of FIG. 7 and any repetitive explanation concerning the above elements will be omitted.

Referring to FIG. 8, the display apparatus includes a display panel 100 and a panel driver driving the display panel 100.

The panel driver includes a frame rate converter 200, a memory 300A, a timing controller 400, a gate driver 600 and a data driver 700.

The frame rate converter 200, the memory 300A and the timing controller 400 are connected with one another through a first wiring having three terminals. A first terminal of the first wiring is connected to the frame rate converter 200. A second terminal of the first wiring is connected to the memory 300A. A third terminal of the first wiring is connected to the timing controller 400. The frame rate converter 200 may write the input image data RGB to the first memory 300 through the first wiring. The frame rate converter 200 may read the input image data RGB from the memory 300A through the first wiring. The frame rate converter 200 may write the first image data FRGB to the memory 300A through the first wiring. The timing controller 400 may read the first image data FRGB from the memory 300A through the first wiring.

According to the fourth exemplary embodiment, the frame rate converter 200, the memory 300A and the timing controller 400 are connected with one another through the first wiring having the three terminals so that a structure for transmitting data of the display apparatus may be more simplified as compared to the display apparatus of the third exemplary embodiment shown in FIG. 7. Thus, a manufacturing cost of the display apparatus may be decreased, and a display quality of the display panel 100 may be improved.

According to the fourth exemplary embodiments of the present invention as explained above, a structure for transmitting data of the panel driver may be simplified so that a manufacturing cost of the display apparatus may be decreased and a display quality of the display panel may be improved.

Although the display panel of the exemplary embodiments described above is a liquid crystal display panel, other display panels may be used. For example, exemplary embodiments of the present invention could be used with a plasma display panel, an organic light emitting diode display panel, etc.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of driving a display panel, the method comprising:

converting, via a frame rate converter, a frame rate of input image data using a first memory to generate first image data;

writing the first image data to a second memory;

outputting a flag signal to a timing controller, the flag signal being configured to control an operation of the timing controller, the flag signal comprising a read signal or a write signal;

reading, via the timing controller, the first image data from the second memory according to the flag signal when the flag signal is the read signal;

compensating the first image data to generate second image data; and converting the second image data into a data signal and outputting the data signal to the display panel, wherein the frame rate converter is directly connected to the second memory to directly write the first image data to the second memory.

2. The method of claim 1, further comprising:

compressing the first image data before writing the first image data to the second memory; and decompressing the compressed first image data before compensating the first image data to generate second image data.

3. The method of claim 1, wherein the flag signal has a differential mode.

4. The method of claim 1, wherein the first image data are further compensated using previous frame data and present frame data of the first image data.

5. The method of claim 1, wherein the data signal is an analog voltage.

6. The method of claim 1, wherein the frame rate of the first image data is a multiple of the frame rate of the input image data.

7. A display apparatus comprising:

a display panel configured to display an image;

a frame rate converter configured to convert a frame rate of input image data using a first memory to generate first image data, to write the first image data to a second memory, and to generate a flag signal, the flag signal being configured to control an operation of a timing controller, the flag signal comprising a read signal or a write signal;

the timing controller configured to read the first image data from the second memory according to the flag signal when the flag signal is the read signal and to compensate the first image data to generate second image data; and a data driver configured to convert the second image data into a data signal and to output the data signal to the display panel, wherein the frame rate converter is directly connected to the second memory to directly write the first image data to the second memory.

8. The display apparatus of claim 7, wherein the frame rate converter comprises a compression encoder configured to compress the first image data; and the timing controller comprises a compressing decoder configured to decompress the compressed first image data.

9. The display apparatus of claim 7, wherein the flag signal has a differential mode.

10. The display apparatus of claim 7, wherein the timing controller further comprises a dynamic capacitance compensation part configured to compensate the first image data using previous frame data and present frame data of the first image data.

11. The display apparatus of claim 7, wherein at least one of the frame rate converter, the timing controller, the first memory and the second memory comprises a pad part comprising an input part and an output part, and the pad part is configured to permit bidirectional communication.

12. The display apparatus of claim 11, wherein the pad part comprises a variable resistor connected in parallel with both the input part and the output part.

13. The display apparatus of claim 7, wherein the frame rate converter, the first memory and the second memory are connected with one another through a first wiring having three terminals.

14. The display apparatus of claim 7, wherein the data signal is an analog voltage.

15. The display apparatus of claim 7, wherein the frame rate of the first image data is a multiple of the frame rate of the input image data.

16. The display apparatus of claim 7, wherein a transmission speed between the frame rate converter and the second memory is greater than a transmission speed between the frame rate converter and the timing controller.

* * * * *